Feb. 17, 1942.  S. QUISLING  2,273,732
METHOD OF MAKING SLIDE FASTENERS
Filed Jan. 10, 1939   2 Sheets-Sheet 1
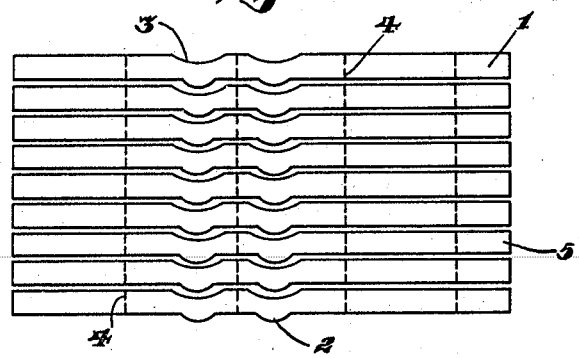
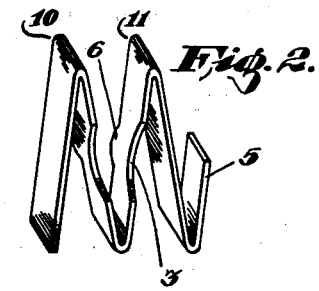
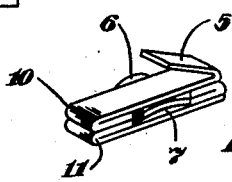
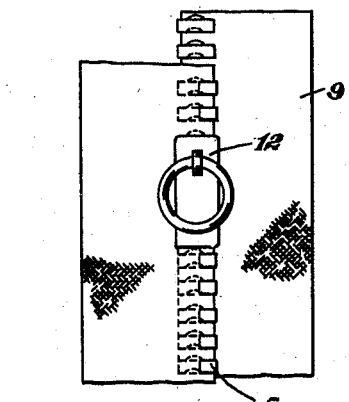
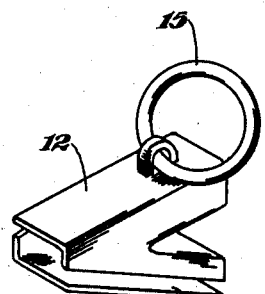
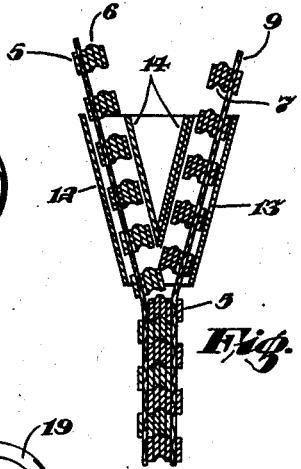
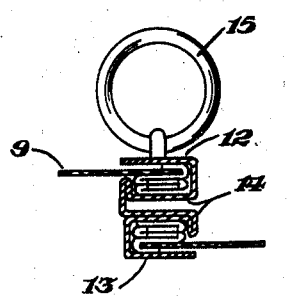
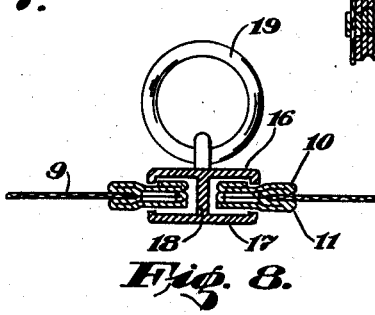
INVENTOR.
Sverre Quisling
BY Kelley & Chisholm
ATTORNEYS.

Feb. 17, 1942.                  S. QUISLING                      2,273,732
                      METHOD OF MAKING SLIDE FASTENERS
                      Filed Jan. 10, 1939        2 Sheets-Sheet 2
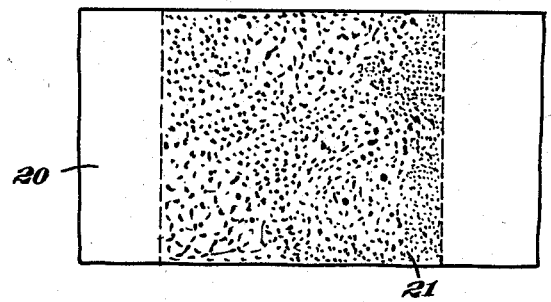
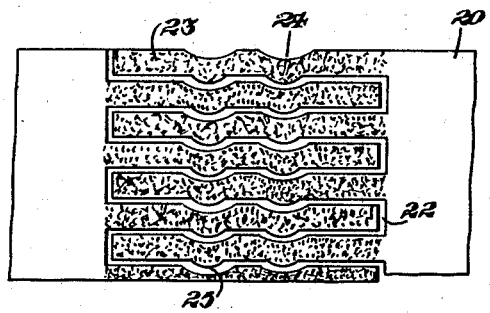
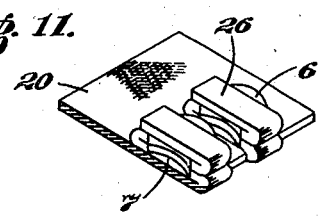
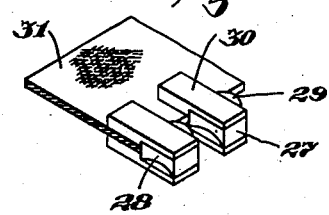
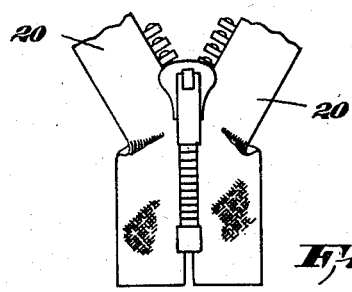
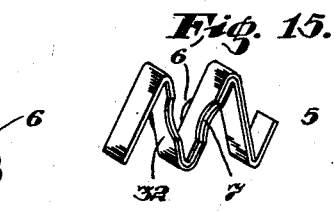
INVENTOR.
Sverre Quisling
BY Kelley Chisholm
ATTORNEYS.

Patented Feb. 17, 1942

2,273,732

UNITED STATES PATENT OFFICE 2,273,732

METHOD OF MAKING SLIDE FASTENERS

Sverre Quisling, Madison, Wis., assignor to Talon, Inc., Meadville, Pa., a corporation of Pennsylvania Application January 10, 1939, Serial No. 250,180

11 Claims. (Cl. 154—2)

This invention relates to separable fasteners, and more particularly to that class of separable fasteners which comprise opposed series of interdigitating elements on opposing free edges of a closure and adapted to be brought together and to be interlocked and disengaged progressively by means of a slider, and to methods for making such fasteners.

This application is a continuation in part of my co-pending applications Serial Nos. 71,011, filed March 26, 1936, and 136,754, filed April 14, 1937.

My invention provides a practical method whereby slide fastener elements can be made of thermo-setting plastic materials, including such hitherto commercially unsatisfactory plastics but very desirable plastics such as those of the phenol-formaldehyde type. An advantage in the use of the phenol-formaldehyde type plastic is that it does not soften on heating and is not affected by cleaning fluids, as are cellulose plastics now used in the manufacture of fastener elements. The phenol-formaldehyde fastener elements placed on garments may be boiled or dry cleaned without danger to the fastener elements. When reference is made herein to phenol-formaldehyde fastener elements it is intended to include also fibrous materials impregnated with a phenol-formaldehyde condensation product. Such a fastener may also be less bulky and neater in appearance than the conventional types of fasteners.

It is possible to make fastener elements according to the present invention that can be secured or applied to overlapping edges of fabrics, being so placed relative to the surfaces to be joined so that the constituent parts, including the slider, may remain concealed.

It is also possible to make a fastener entirely free from danger of catching or tearing the skin when used in garments worn next to the skin, such as on a corset.

The fastener made in accordance with the present invention, due to the simplicity of processes of manufacturing and to the type material used, can be made at very low cost.

The invention makes possible the elimination of the usual beaded edge on the stringer in fasteners where such beaded edge is unnecessary, thus further lowering the cost of manufacture.

The fastener elements may be so shaped as to carry guideways for the slider whereby the slider comes in contact only with the fastener elements, thereby eliminating wear on the fabric to which the elements are secured.

The above and other objects and advantages of the invention will be more fully apparent to those skilled in the art after reading the following description of some preferred embodiments.

In the drawings which accompany and form a part of this specification,

Fig. 1 is a plan view of a sheet of material after being cut into strips preparatory to making fastener elements, according to one form of my improved process;

Fig. 2 is a perspective view showing the manner of folding up the strip to make individual fastener elements;

Fig. 3 is a perspective view showing a fastener element substantially completed;

Fig. 4 shows a fastener of the overlapping type made from elements such as shown in Fig. 3;

Fig. 5 is a central cross-section through the interlocking portions and slider of such fastener;

Fig. 6 is a transverse section through the same fastener;

Fig. 7 is a perspective view of a slider adapted for the fastener shown in Figs. 4, 5 and 6;

Fig. 8 is a transverse cross-section showing how the fastener elements of Fig. 3 may be applied to an edgewise interlocking fastener;

Fig. 9 is a plan view of a portion of fabric impregnated or coated with a plastic substance useful in another embodiment of my process;

Fig. 10 is a view of the same sheet after cutting;

Fig. 11 shows one manner of folding up the projecting tongues on the strips to form fastener elements integral with the strips;

Fig. 12 shows another method of folding up the tongues to provide fastener elements which project from the edge of the strip;

Fig. 13 is a view of a completed fastener made from the type of element shown in Fig. 12;

Fig. 14 illustrates another modification wherein a rigid block is used as the main body of the fastener element; and Fig. 15 shows a modified process of making fasteners intended especially for use with phenol-formaldehyde condensation products.

Referring to the drawings in the embodiment of the process shown in Figs. 1 to 3, I provide a sheet of flexible material which may consist wholly of plastic material as shown, or may consist of a textile fabric impregnated with a plastic, such as cellulose acetate, cellulose nitrate, urea resin, vinyl plastic material, phenol-formaldehyde condensation product or other formaldehyde condensation products. In the use of certain of these plastics, such as the phenol-formaldehyde condensation product known as "Bakelite," the flexible material is impregnated with the plastic in state "A". The plastic, in this state, is soluble in various organic solvents and the material is left flexible after impregnation. In this condition, the material may be formed into any desired shape before converting the plastic into states "B" and "C". The plastic is converted into state "B" by the application of heat and pressure, in which state it is insoluble in solvents but will swell when treated with solvents. Further application of heat and pressure converts the plastic into state "C", in which state it is unaffected by heat or solvents.

The impregnated material is then cut into strips 1, as shown in Fig. 1, the strips shown being of uniform width and having pairs of projecting tongues 2 at points along one edge, and corresponding recesses 3 along the other edge. The strips are then bent along the longitudinal dotted lines 4 of Fig. 1, into a substantially M shape with hook 5. The four legs of the M are subsequently brought together to superpose them and provide a completed fastener element as shown in Fig. 3. Hook portion 5 serves to hold the element to the fabric as shown in Fig. 4 and also serves as a guide for the slider. The tongues 2 of two adjacent folded portions, form a single central projection 6 of double thickness projecting outwardly between the outside folds. The registering recesses of blank 1 form a single recess 7 between the outside folds in the other side of the fastener element. The fastener should be made preferably of material cut slantwise through its thickness both at tongue and recess so that the resulting joint between adjacent opposed interlocked elements have a loose ball and socket effect.

The fastener elements as folded up in Fig. 3 are then ready for application to a cloth tape or directly to the edges of a garment or the like which it is intended to fasten. In such application of the fastener elements to the edge of the cloth tape or garment, if it is desired to have an overlapping and partially concealed effect as shown in Figs. 4 and 5, the edge of the opening or stringer is inserted under the hook-like portion 5 and then the hook portion pressed down against it. If it is desired to have a fastener more nearly resembling the conventional slide fastener, the edges of the stringers or of the material bordering the opening herein designated 9, are inserted between the two double folds 10, 11 of the fastener element. In either case the edge of the tape may if desired be impregnated with a suitable bonding agent as hereinafter more fully explained.

In this construction of fastener elements the plies are laminated and maintained in fixed relation to form a unitary structure by bonding or coalescing the adjacent contacting surfaces. Bonding of the contacting surfaces may be accomplished by any suitable means, such as by an actual fusion of the contacting surfaces, by the fusion of a coating which is adherent to the contacting surfaces, by the fusion of a material compatible with the contacting surfaces and placed between the surfaces in the laminating process, by the use of an adhesive coating on one or both of the contacting surfaces, by the use of an adhesive material placed between the surfaces in the laminating process, and the like.

Any desired sheet material may be used in the construction of my fastener elements, such as metal, cellulose acetate, cellulose nitrate, furfural condensation products, urea resins, vinyl resins, phenolic condensation products, formaldehyde condensation products, glass, and the like, or fabric, pulp or paper sheets impregnated with a plastic.

For illustrative purposes, assume that the material consists of a textile fabric impregnated with a solution of a plastic material of the phenol-formaldehyde type in state A. Impregnation of the textile material with this type and state of plastic material leaves the material in a stiffened but somewhat flexible condition, and permits a blank, cut therefrom, to be formed into any desired shape before the plastic material is converted into state B or state C by the application of heat and pressure. The adjacent contacting surfaces of the fastener elements are bonded together and the fastener elements are bonded to the closure material by the application of heat and pressure to form the completed fastener elements.

If it is desired to use metal as the material of the fastener elements, I prefer to coat the metal with a low melting point metal or alloy which will coalesce and bond at a temperature which is not harmful to the closure material. It is apparent that the fastener element is formed in the same manner as described hereinbefore and that the bonding of the coating will maintain the folds or plies in fixed or closed relation. The only difference is the manner in which the fastener elements are secured to the closure material. In the case of metal fastener elements, the base of the elements may be provided with small tangs or the like, which are embedded in the closure material when the base sections are pressed together.

I have found that I may use a solution of cellulose acetate to impregnate a fabric or paper material to form the foundation material. The formed fastener elements are secured to the edges of the closure material by saturating the edges of the material with a suitable solvent, for example, acetone, and pressing the fastener elements to the closure material. On evaporation of the solvent, it is found that a small amount of the cellulose acetate of the foundation material, in contact with the saturated closure material, has been dissolved and has has migrated or permeated into the closure material, thereby bonding together the fastener elements and the closure material. Cellulose nitrate and vinyl resin plastics may be employed in a similar manner. Sheets of these materials have also been emloyed in a similar manner. If desired, the fastener elements may also be secured to the closure material by the application of heat or heat and pressure without the use of a solvent.

I have also found that in the use of plastics, such as the phenol-formaldehyde condensation product such as "Bakelite," I may use a sheet of this material in state B. The formed blanks are heated to render the foundation material plastic and the blanks are then folded. To bond the folds or plies, and to bond the elements to the closure material, I insert a thin sheet of fabric or paper impregnated with state A of the plastic between the plies and between the plies and between the plies and closure material prior to the application of the final heat and pressure.

It will be understood that the designs of fasteners shown are purely illustrative and that various types of shapes and arrangements of interlocking elements may be devised. Likewise the form of slider for any style of interlocking element which may be selected will be designed to suit the particular shape and arrangement of the fastener elements. The slider for the form shown in Figs. 1 to 7 may be termed an S-shaped slider with outer plates 12 and 13 and inner plates 14 which converge together at the narrow end of the slider to bring the fastener elements into overlapping relation and into engagement in the manner shown in Fig. 5. Any convenient pull tab 15 may be attached to the outer plate 12. The slider for the form shown in Fig. 8 may be of a style closely resembling that found on the usual commercial slide fasteners. It includes upper and lower plates 16, 17, respectively, connected by a wedge portion 18 and may have any suitable form of pull tab 19.

The slider in any case will serve as is well understood in the art, to bring the free edges with their staggered fastener elements together so that the tongues or projections of the fastener elements engage in the recesses of the fastener elements on the opposite side. Whereas in the construction which has just been described, the fastener elements can be made from plastic sheets or from sheets impregnated with plastic and then applied to the tape by solvent or heat combined with pressure depending on the type of plastic used thus causing the plastic material of the fastener element to impregnate the cloth tape or the edge of the article to which it is attached, the construction shown in Figs. 9 to 13 uses an integral portion of the tape itself in the formation of the fastener elements so that they are integral with the edges of the tape.

In this modified process a sheet of plastic material 20 is impregnated with the desired plastic material 21 between the dotted lines as illustrated in Fig. 9. By a suitable cutting tool or punch slots 22 are cut out leaving tongues of impregnated material 23 extending in staggered relation from the opposed edges of the fabric. The single piece of fabric 20 is then cut into two strips each provided with similarly shaped tongues. These tongues of material have recesses 24 and projections 25 as in the first modification described and they are folded upon themselves in the manner illustrated in Fig. 11 so that the projections and recesses register with each other thus making a recess and projection of the original thickness of the material. The end 26 of each tongue constitutes one side wall of the recess whereas the original piece of material 20 constitutes the opposite side wall of the recess.

In the illustration of Fig. 11 these fastener units are in overlapping relation with the tape to make a construction where the interlocking units will be concealed and the fastener will engage in a sidewise direction as in Fig. 4. In making the fastener shown in Fig. 12 the tongues would be cut somewhat longer so that the fastener units would extend outwardly from the edge of the base tape 20. In this manner the fastener could be brought together in an edgewise interlocking relation as shown in Fig. 8. In other respects it would be made in the same manner as the fastener shown in Fig. 11.

In Fig. 14 I shown an adaptation of the same basic principles of my invention to a somewhat different form of fastener. A substantially rigid block 27 having a suitable shaped recess 28 and projection 29 is placed between two pieces of material 30 adapted to lie on opposite sides of the tape. The pieces 30 may be impregnated with the plastic or may themselves be plastic strips as above described and they may be united to the base tape 31 in substantially the same way as the other modifications. The blocks 27 may be plastic material, metal or anything which can be bonded satisfactorily to the strips 30.

Fig. 15 is intended to illustrate a modified process which has to some extent been above described, wherein a thin sheet of paper 32 or fabric impregnated with state A of a phenol formaldehyde plastic is placed between the plies of the laminated fastener element prior to the application of the final heat and pressure.

While I have shown and described in this application certain preferred embodiments which my invention may assume in practice, it will be understood that these embodiments are for the purposes of illustration and that various other forms may be devised within the scope of my invention as set forth in the appended claims.

What I claim as my invention is:

1. The process of forming slide fastener stringers each consisting of a flexible member having a series of interdigitating fastener elements attached thereto, which comprises impregnating fibrous material with a phenol formaldehyde condensation product in a workable state, shaping the interdigitating fastener members from the impregnated fibrous material, attaching the same to the flexible member, and converting the shaped phenol formaldehyde material to a hard and inert material after attachment to the flexible member.

2. The method of making slide fastener stringers of the class described each having a series of slide fastener interdigitating members attached to a flexible tape, which comprises forming the fastener interdigitating members from a material which includes a thermo-setting resin with at least the tape contacting portions of said interdigitating members in uncured state, placing such fastener members while in such state on the tape, and curing the said tape attached fastener members by the application of heat to cause the fastener members to adhere firmly to the tape.

3. The method of forming laminated interdigitating fastener elements which comprises impregnating a flexible fabric sheet with a solution of a plastic comprising a phenol formaldehyde condensation product in state A, cutting said impregnated material into elongated blanks of substantially uniform width throughout their lengths and having a pair of projections on one side adjacent the midpoint of said blanks and having a pair of recesses in the other side of said blanks opposite said projections, folding each of said blanks longitudinally upon itself in such a manner so that said projections register with each other and said recesses register with each other, folding the end portions of said halves upon themselves to form outer plies, and applying heat and pressure to the element thus assembled to unite the adjacent contacting faces of said plies.

4. The method of forming laminated interdigitating fastener elements which comprises impregnating a flexible fabric sheet with a solution of a cellulose plastic, cutting said impregnated material into elongated blanks of substantially uniform width throughout their lengths and having a pair of projections on one side adjacent the midpoint of said blanks and having a pair of recesses in the other side of said blanks opposite said projections, folding each of said blanks longitudinally upon itself in such a manner so that said projections register with each other and said recesses register with each other, folding the end portions of said folded halves upon themselves to form outer plies, and treating the element thus assembled with a solvent for said plastic to unite the adjacent contacting faces of said plies.

5. The method of forming interdigitating fastener elements which comprises cutting sheet material including a plastic, into elongated blanks of substantially uniform width throughout their lengths and having a pair of projections on one side adjacent the midpoint of said blanks and having a pair of recesses in the other side of said blanks opposite said projections, folding each of said blanks longitudinally upon itself in such a manner so that said projections register with each other and said recesses register with each other, folding the end portions of said folded halves upon themselves to form outer plies, and softening the plastic on the contacting faces of said plies of the element thus assembled to unite the adjacent contacting plies.

6. The method of forming interdigitating fastener elements which comprises impregnating a flexible fabric material with a plastic to form sheet material, cutting said sheet material into elongated blanks of substantially uniform width throughout their lengths and having a pair of projections on one side adjacent the midpoint of said blanks and having a pair of recesses in the other side of said blanks opposite said projections, folding each of said blanks longitudinally upon itself in such a manner so that said projections register with each other and said recesses register with each other, folding the end portions of said folded halves upon themselves to form outer plies and softening the plastic on the contacting faces of said plies of the element thus assembled to unite the adjacent contacting plies.

7. The method of forming interdigitating fastener elements integral with the closure material which comprises impregnating the marginal portions of said material with a plastic, cutting said impregnated portions into elongated spaced blanks, projecting from said closure material and having a pair of projections on one side and having a pair of recesses in the other side opposite said projections, folding each of said blanks longitudinally in half in such a manner so that said projections and said recesses register with each other, folding the end portions of said halves upon themselves to form outer plies, and softening the plastic on the contacting faces of said plies of the elements thus assembled to unite the adjacent contacting plies.

8. The method of forming interdigitating fastener elements which comprises cutting sheet material impregnated with a plastic adapted to be softened by the application of heat into elongated blanks of substantially uniform width throughout their lengths and having a pair of projections on one side adjacent the midpoint of said blanks and having a pair of recesses in the other side of said blanks opposite said projections, folding each of said blanks longitudinally upon itself in such a manner so that said projections register with each other and said recesses register with each other, folding the end portions of said folded halves upon themselves to form outer plies, and applying heat and pressure to the element thus assembled to unite the adjacent contacting plies.

9. The method of forming laminated interdigitating fastener elements integral with the closure material which comprises impregnating the marginal portions of said material with a plastic, said plastic being adapted to be softened by the application of heat, cutting said impregnated portions into elongated spaced blanks projecting from said closure material and having a pair of projections on one side and having a pair of recesses in the other side opposite said projections, folding each of said blanks longitudinally in half in such a manner so that said projections and said recesses register with each other, folding the end portions of said halves upon themselves to form outer plies, and applying heat and pressure to the element thus assembled to unite the adjacent contacting folds.

10. The method of forming laminated interdigitating fastener elements which comprises cutting sheet material including a plastic adapted to be softened by the application of a solvent, into elongated blanks of substantially uniform width throughout their lengths and having a pair of projections on one side adjacent the midpoint of said blanks and having a pair of recesses in the other side of said blanks opposite said projections, folding each of said blanks longitudinally upon itself in such a manner so that said projections register with each other and said recesses register with each other, folding the end portions of said folded halves upon themselves to form outer plies, and applying a solvent to the element thus assembled to unite the adjacent contacting plies.

11. The method of forming laminated interdigitating fastener elements integral with the closure material which comprises impregnating the marginal portions of said material with a plastic, said plastic being adapted to be softened by the application of a solvent, cutting said impregnated portions into elongated spaced blanks projecting from said closure material and having a pair of projections on one side and having a pair of recesses in the other side opposite said projections, folding each of said blanks longitudinally in half in such a manner that said projections and said recesses register with each other, folding the end portions of said halves upon themselves to form outer plies, and treating the element thus assembled with a solvent for said plastic to unite the adjacent contacting folds.

SVERRE QUISLING.